United States Patent Office 3,763,233
Patented Oct. 2, 1973

3,763,233
7-SUBSTITUTED-HEXAHYDRO PLEIADENES
William J. Houlihan, Baden, Austria, and Jeffrey Nadelson, Parsippany, N.J., assignors to Sandoz-Wander, Inc., Hanover, N.J.
No Drawing. Filed Aug. 17, 1971, Ser. No. 172,587
Int. Cl. C07c 87/34, 103/22, 127/14
U.S. Cl. 260—553 R                              4 Claims

ABSTRACT OF THE DISCLOSURE

Hexahydro pleiadenes substituted at the seven position, e.g., 1,2,3,7,12,12a - hexahydro - 7 - carboxamido pleiadene, and dibenzoheptalenes substituted at the 8-position, e.g., 1,2,3,4 - tetrahydro - 8 - (1 - methyl - 4 - piperidyl)- 8H-dibenzo[b,ef]heptalene, prepared from corresponding 7-substituted-hexahydro pleiadenes and 8-substituted dibenzoheptalenes, are useful as anti-convulsants.

---

This invention relates to pleiadenes substituted at the 7-position and dibenzoheptalenes substituted at the 8-position. Moreover, the invention concerns intermediates and pharmaceutically acceptable salts of said compounds, and processes therefor.

The compounds of this invention may be represented by the following structural formula:

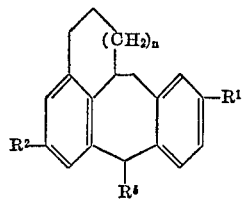

(I)

where $n$ represents 1 or 2;
$R^1$ represents H, halo having an atomic weight of 19–36, or trifluoromethyl; and
$R^2$ represents H, halo having an atomic weight of 19–36, trifluoromethyl, straight chain lower alkyl, e.g., straight chain alkyl or 1–4 carbon atoms, e.g., methyl, ethyl and butyl, or straight chain lower alkoxy, i.e., straight chain alkoxy having 1–4 carbon atoms, e.g., methoxy, ethoxy or propoxy; and
$R^4$ represents

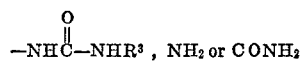

$-NHC-NHR^3$, $NH_2$ or $CONH_2$ wherein $R^3$ represents lower straight chain alkyl having 1–4 carbon atoms, e.g., methyl, ethyl and butyl.

Compounds of Formula I in which $R^4$ represents the group

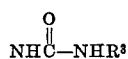

$NHC-NHR^3$ are prepared according to the following reaction scheme:

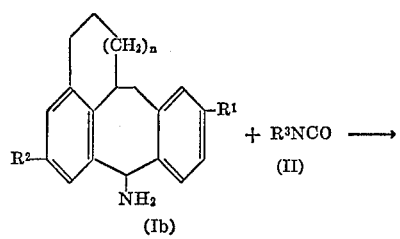

+ $R^3NCO \longrightarrow$ (II)

(Ib)

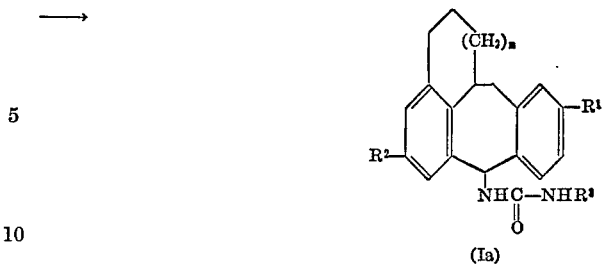

(Ia)

where $R^1$, $R^2$, $R^3$ and $n$ are as previously defined.

This process may be carried out by treating a compound of the Formula Ib with a compound of the Formula II in a suitable inert organic solvent. Although the particular solvent used is not critical, hydrocarbon solvents such as benzene, toluene, xylene and ethers such as tetrahydrofuran or diethyl ether may be used, especially diethyl ether. The reaction temperature is about 0°–80° C., preferably 20° to 30° C., although the temperature is not critical. The reaction time may vary widely and is usually in the range of 1–24 hours.

Compounds of the Formula Ib are prepared according to the following reaction scheme:

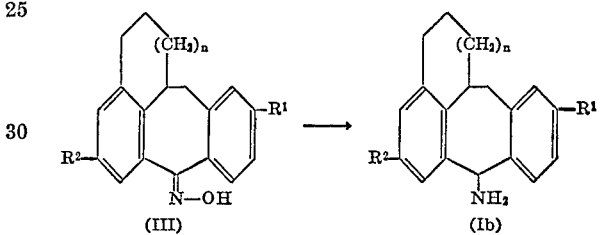

(III)            (Ib)

where $R^1$, $R^2$ and $n$ are as previously defined.

This process may be carried out by reducing a compound of the Formula III in the presence of an inert organic solvent. The reducing agent used can be any of the standard reducing agents, in particular, an alkali metal alkanol especially a sodium metal ethanol. Although, the particular solvent used is not critical, the lower alkanols are preferred, e,g., methanol, propanol, and ethanol, the latter being preferred. The reaction may be carried out at a temperature of about 50–150° C., preferably at the reflux temperature of the reaction mixture. The reaction time may vary widely and depends upon rate of sodium addition, preferably from 1 to 3 hours.

Compounds of the Formula III are prepared according to the following reaction scheme:

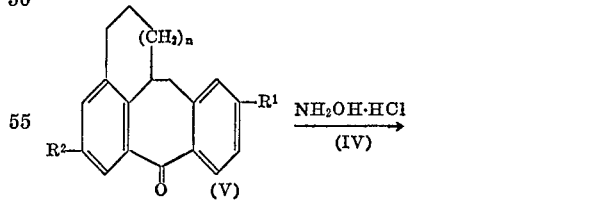

$NH_2OH \cdot HCl$
$\xrightarrow{\text{(IV)}}$

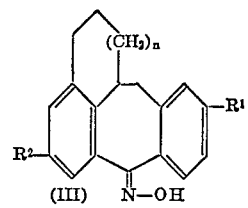

(III)    N—OH wherein $R^1$, $R^2$ and $n$ are as previously defined.

This process may be carried out by treating a compound of the Formula V with a compound of the Formula IV or an acid addition salt thereof in a suitable inert organic solvent. Although the particular solvent used is not critical, hydrocarbon solvents such as benzene, toluene, xylene and pyridines may be employed, the latter being preferred. The reaction temperature is about 80–180° C., preferably at the reflux temperature of the reaction mixture. The time of reaction may be from 10 to 48 hours.

Compounds of the Formula V are prepared according to the following reaction scheme:

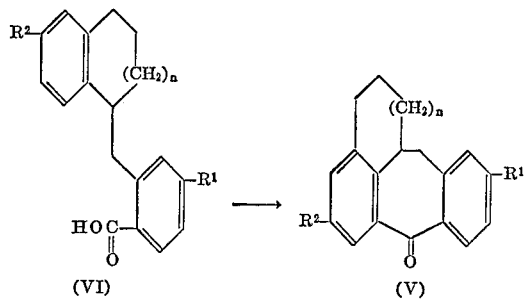

where $R^1$, $R^2$ and $n$ are as previously defined.

Compounds V may be prepared by treating compounds VI with strong mineral acid, e.g., sulfuric acid or polyphosphoric acid, preferably polyphosphoric acid, at about 70° C. to about 120° C., preferably 80° C. to 100° C., for about 1–5 hours. Although solvent is not considered necessary, solvents which may be used include aromatic or aliphatic hydrocarbons, e.g., benzene, toluene, pentene and the like. The temperatures, solvents and time of reaction are not critical.

The compounds VI are obtainable according to the following multi-step reaction scheme:

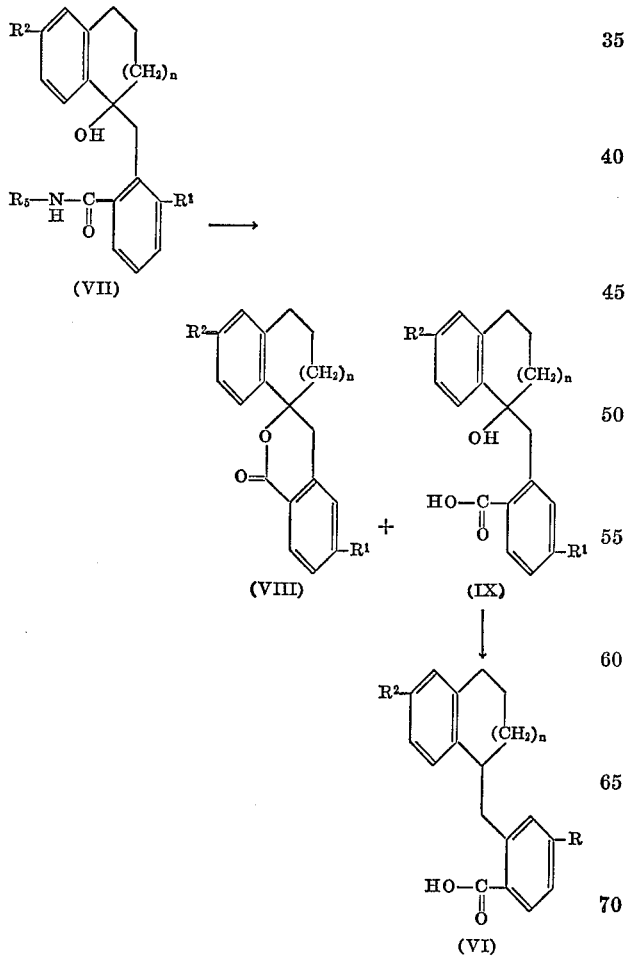

wherein $R^1$, $R^2$, and $n$ are as previously defined, and $R^5$ represents lower alkyl, i.e., alkyl of 1–4 carbon atoms, e.g., methyl or ethyl.

Compounds VII provide compounds VIII and IX when treated first with strong base such as alkali or alkaline earth metal hydroxide or hydrides, e.g., sodium hydroxide, potassium hydroxide, calcium hydroxide or sodium hydride in aqueous or alcoholic solvents, such as lower alkanols, e.g., methanol, ethanol, isopropanol, and the like, or mixtures thereof, at about 60° to 180° C., preferably 70°–100° C., for about 12–48 hours. The resulting product may then be treated in the above solvent with strong mineral acid such as hydrohalic acid, e.g., hydrochloric acid or hydrobromic acid, or sulfuric acid, phosphoric acid and the like, at a temperature of from about —10° to 15° C., preferably —5° to 10° C. The time and temperature of the reaction and the particular solvent utilized is not critical. The resulting compounds VIII and IX may be separated using conventional techniques. Compounds VIII and IX, together or separately, may be converted to the acids of Formula VI by reduction. Accordingly, compound VI may be obtained by treating compounds VIII and IX with hydrogen gas in alcoholic solvents, such as lower alkanols, e.g., methanol, ethanol or propanol, in the presence of strong mineral acids such as hydrohalic acid, e.g., hydrochloric acid or hydrobromic acid, or sulfuric acid and the like, over palladium catalyst, preferably 5% to 30% palladium on carbon, conveniently 10% Pd/C. at a temperature of 20–80° C., preferably 25°–35° C., and a pressure of about 35–100 p.s.i. for about 2–4 hours. The pressure, temperature, time of reaction and particular solvent utilized are not critical.

Compounds VII may be prepared according to the following reaction scheme:

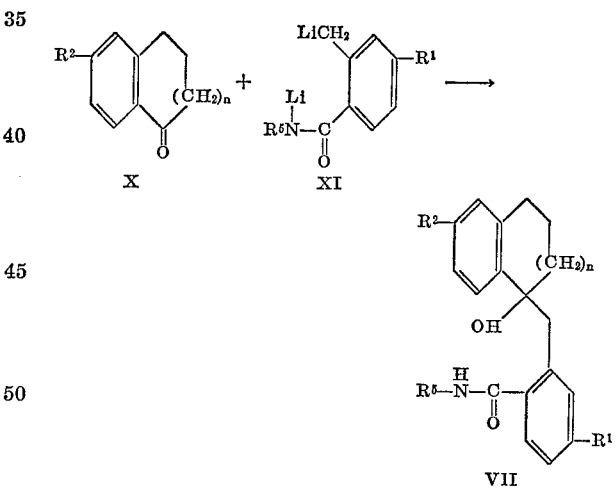

wherein $R^1$, $R^2$, $R^5$ and $n$ are as previously defined.

Compound VII may be prepared by condensing a compound X with a compound XI in an inert atmosphere, e.g., nitrogen gas, and in an inert solvent such as ether, e.g., diethyl ether or tetrahydrofuran, or hydrocarbons or aromatic hydrocarbons such as hexane, heptane, benzene, toluene and the like and subjecting the reaction mixture to hydrolysis, preferably with water at about —10° to 10° C. The condensation may be carried out at a temperature of from about —60° to —40° C., preferably about —50° C. for about 1 to 3 hours. The exact time and temperature of reaction and the particular solvent used is not critical in obtaining the product VII.

It will be understood that certain of the compounds X and XI are known and may be prepared according to methods disclosed in the literature. Those compounds of Formulas X and XI not known may be prepared by analogous compounds from known materials.

Another aspect of this invention is the preparation of the compound of the Formula I in which $R_4$ is $CONH_2$ (Ic):

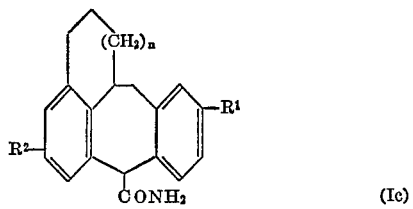

wherein $R^1$ and $R^2$ are as previously defined.

Compounds of Formula I are prepared according to the following reaction scheme:

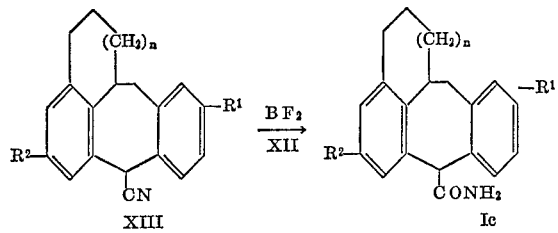

This process may be carried out by treating a compound of Formula XIII with boron trifluoride in a suitable inert organic solvent. Solvents which may be employed include the lower carboxylic acids, e.g., propionic acid or acetic acid, the latter being preferred. The reaction temperature is about 110° to 150° C., preferably from 125° to 135° C. The reaction time may vary widely and is usually in the range of 5–45 minutes. However, the temperatures, solvents and time of reaction are not critical.

Compounds of the Formula XIII are prepared according to the following reaction scheme:

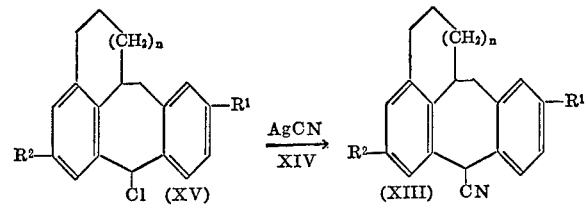

wherein $R^1$, $R^2$ and $n$ are as previously defined.

This process may be carried out by treating a compound of the Formula XV with silver cyanide in a suitable inert organic solvent. Although the particular solvent used is not critical, hydrocarbon solvents such as benzene, toluene, xylene are preferred, especially benzene. The reaction temperature is from 50° to 150° C., preferably at the reflux temperature of the reaction mixture. The time may vary widely and is usually in the range of 2 to 24 hours. The time and temperature of the reaction are not critical.

Compounds of the Formula XV are prepared according to the following reaction scheme:

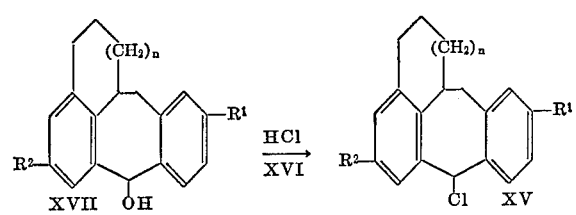

wherein $R^1$, $R^2$ and $n$ are as previously defined.

This process may be carried out by treating a compound of the Formula XVII with a halogenating agent, e.g., sulfonyl chloride, phosphorus pentachloride, especially gaseous hydrochloric acid in a suitable organic solvent. Although the particular solvent used is not critical, hydrocarbon solvents such as benzene, toluene, xylene and ethers such as tetrahydrofuran or diethyl ether are preferred, especially benzene. The reaction temperature is from about 0° to 80° C., preferably from about 20° to 30° C. The time may vary widely and usually is in the range of 5 to 45 minutes.

Compounds of the Formula XVII are prepared according to the following reaction scheme:

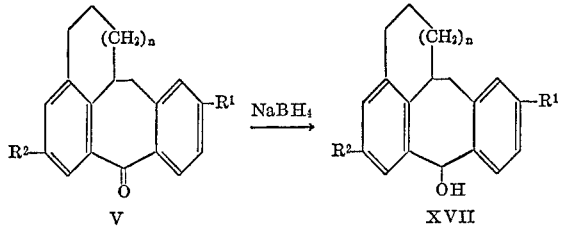

This process may be carried out by reducing a compound of the Formula V in the presence of an inert organic solvent. The agent employed is a reducing hydride, especially sodium borohydride. Although the particular solvent used is not critical, the lower alkanols are employed, e.g., methanol, propanol and ethanol, the latter being preferred. The reaction temperature is from about 0° to 80° C., preferably 20° to 30° C. The reaction time may vary widely and is usually from about 1 to 24 hours.

All of the above-mentioned compounds may be recovered using conventional techniques, e.g., filtration or recrystallization. It will be understood that certain of the compounds of Formulas I, Ia, Ib, III, V, VI, VII, VIII, IX, XIII, Ic, XV, and XVII exist in racemic form or in the form of optically active isomers. The separation and recovery of respective isomers may be readily accomplished employing conventional techniques and such isomers are included within the scope of the invention.

The compounds of the Formula I are useful because they possess pharmacological activity in animals. More particularly, the compounds possess anti-convulsant activity as indicated by their activity in mice given 131.9 mg./kg. of body weight of active material and tested using the method basically as described by Orloff et al. (Proc. Soc. Exp. Biol. 70: 254, 1949) respecting chemically induced seizures.

For such use, compounds of the Formula I may be combined with a pharmaceutically acceptable carrier or adjuvant, and may be administered orally in such form as tablets, capsules, elixirs, suspensions and the like or parenterally in the form of an injectable solution or suspension. The dosage will vary depending upon the mode of administration utilized and the particular compound employed.

The compounds of the Formula I may be suitably administered in the form of their non-toxic pharmaceutically acceptable acid addition salts. Such salts possess the same order of activity as the free base, and are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the maleate, fumarate, tartrate, citrate, succinate, benzoate, acetate, p-toluenesulfonate, benzenesulfonate and the like.

In general, satisfactory results for anti-convulsant activity are obtained when the compounds are administered at a daily dosage of from about 1–200 milligrams per kilogram of animal body weight. The daily dosage is preferably given in divided doses, e.g., 2 to 4 times a day, or in sustained release form. For most large animals, the total daily dosage is from about 75 to 2000 milligrams and dosage forms suitable for internal administration comprise from about 20 to 1000 milligrams of the compound in admixture with a solid or liquid pharmaceutical carrier or diluent.

As previously noted, the compounds of Formula I exist as optical isomers. In some cases greater pharmacological activity or other beneficial attributes may be found for a particular isomer and in such cases administration of such isomer may be preferred.

Tablets and capsules containing the ingredients indicated below may be prepared by conventional techniques and are useful in the treatment of convulsants at a dose of one tablet or capsule 2 to 4 times a day:

| Ingredients | Weight (mg.) | |
|---|---|---|
| | Tablet | Capsule |
| 1,2,3,7,12,12a-Hexahydro-7-carboxamido pleiadene | 250 | 250 |
| Tragacanth | 10 | |
| Lactose | 197.5 | 250 |
| Corn starch | 25 | |
| Talcum | 15 | |
| Magnesium stearate | 2.5 | |

The following pharmaceutical compositions are formulated with the indicated amount of active agent using conventional techniques. The injectable solution and the oral liquid solution represent formulations useful in the treatment of convulsants:

| Ingredients | Weight percent | |
|---|---|---|
| | Injectable | Liquid |
| 1,2,3,7,12,12a-hexahydro-7-carboxamido pleiadene. | 10 | 0.5 to 3.5. |
| Sodium alginate | 0.5 | |
| Sodium benzoate | | 0.1 to 0.5. |
| Simple syrup | | 30 to 70. |
| Lecithin | 0.5 | |
| Sodium chloride | As desired | |
| Flavor | | As desired. |
| Color | | Do. |
| Sorbitol solution 70% USP | | 10 to 30. |
| Buffer agent to adjust pH for desired stability. | As desired | As desired. |
| Water | To desired volume. | To desired volume. |

EXAMPLE 1

α-(1,2,3,4-tetrahydro-1-hydroxy-1-naphthyl)-N-methyl-o-toluamide

To a flask equipped with a stirrer, dropping funnel, condenser and gas inlet tube maintained under a nitrogen atmosphere, there is added at room temperature 40.0 g. (0.28 mole) of o-methyl-N-methyl-benzamide and 250 ml. of anhydrous tetrahydrofuran. The reaction flask is immersed in an ice bath and cooled to an internal temperature of 5° C. Stirring is initiated and 380 ml. of 1.6 n-butyllithium (0.616 mole) in hexane is added dropwise in ca. 1 hour while maintaining the temperature below 8° C. The resulting red dilithio salt is stirred at 5° C. for one additional hour and then the reaction flask is immersed in a Dry-Ice acetone bath and cooled to an internal temperature of −60° C. To the cold reaction mixture a solution of 41.0 g. (0.28 mole) of 3,4-dihydro-1(2H)-naphthalenone in 140 ml. anhydrous tetrahydrofuran is added dropwise in ca. 45 minutes maintaining the temperature between −60° C. and −50° C. The resulting reaction mixture is stirred at −60° C. for 1 hour, allowed to warm to 0° C. ca. 1 hour and then treated with 200 ml. of water while maintaining the temperature below 10° C. The resulting solid is washed thoroughly with water and dried to give α-(1,2,3,4-tetrahydro-1-hydroxy-1-naphthyl)-N-methyl-o-toluamide; M.P. 204–206° C.

EXAMPLE 2

α-(1,2,3,4-tetrahydro-1-hydroxy-1-naphthyl)-o-toluic acid and 3',4' - dihydrospiro[isochroman - 3,1'(2'H)naphthalen]-1-one To a flask equipped with a stirrer, condenser and gas inlet tube maintained under a nitrogen atmosphere, there is added at room temperature 1.7 liters of ethanol, 166 g. of potassium hydroxide pellets (2.96 mole) followed by portion-wise addition of 166.7 g. (0.57 mole) of α-(1,2,3,4 - tetrahydro - 1 - hydroxy - 1 - naphthyl) - N-methyl-o-toluamide. The reaction mixture is then heated at reflux for 48 hours and cooled to an internal temperature of 0° C. Concentrated hydrochloric acid is added, maintaining the temperature below 20° C. until pH 2 is obtained. The resulting precipitate is filtered and washed thoroughly with ethanol, then with water, and dried to provide α-(1,2,3,4-tetrahydro - 1 - hydroxy - 1 - naphthyl) o-toluic acid, M.P. 132–133° C. The ethanolic filtrates are concentrated in vacuo and the residue dissolved in methylene chloride and washed twice with 200 ml. of water, dried over magnesium sulfate, filtered and evaporated to provide crude 3',4' - dihydrospiro[isochroman-3,1'(2'H) naphthalen]-1-one.

EXAMPLE 3

α-(1,2,3,4-tetrahydro-1-naphthyl)-o-toluic acid

A mixture of 30 g. (0.016 mole) of α-(1,2,3,4-tetrahydro - 1 - hydroxy - 1 - naphthyl)-o-toluic acid and 30 g. (0.114 mole) 3',4'-dihydrospiro[isochroman-3,1'-(2'H)-naphthalen]-1-one is dissolved in a liter of ethanol containing 18.1 g. of 10% palladium on carbon (Pd/C) and 9.5 ml. of concentrated hydrochloric acid. The resulting mixture is hydrogenated at 55 p.s.i. and 25° C. on a Parr apparatus until no further hydrogen is absorbed. The mixture is filtered to remove the catalyst and evaporated in vacuo. The residue is dissolved in methylene chloride, washed once with 200 ml. of water, dried over magnesium sulfate, filtered and evaporated to yield α-(1,2,3,4-tetrahydro-1-naphthyl)-o-toluic acid; M.P. 103–107° C.

EXAMPLE 4

1,2,3,12a-tetrahydro-7(12H)-pleiadenone

To a flask equipped with a stirrer, dropping funnel, condenser and gas inlet tube maintained under a nitrogen atmosphere there is added at room temperature 10.6 g. (0.04 mole) of α-(1,2,3,4-tetrahydro-1-naphthyl)-o-toluic acid and 100 ml. of anhydrous benzene. Stirring is initiated and 8.3 g. (0.04 mole) phosphorous pentachloride is added portionwise maintaining the temperature below 30° C. The resulting mixture is then heated at reflux for 1 hour and then cooled to an internal temperature of +5° C. To the cooled reaction mixture a solution of 10.4 ml. (0.088 mole) of stannic chloride in 100 ml. benzene is added dropwise while maintaining the temperature below 8° C. The reaction mixture is stirred 2 hours at 8° C. and then 20 g. of ice and 25 ml. of concentrated hydrochloric acid is added, the resulting mixture refluxed for ½ hour and stirred for 18 hours at room temperature. The layers are separated and the aqueous phase is washed once with 100 ml. benzene. The combined organic phases are washed with 100 ml. of water, 50 ml. of 10% sodium carbonate, 50 ml. of water and 50 ml. of saturated sodium chloride solution. They are then dried over magnesium sulfate, filtered and evaporated to give 1,2,3,12a-tetrahydro-7(12H)-pleiadenone; M.P. 64–68° C.

EXAMPLE 5

1,2,3,7,12,12a-hexahydro-7-oximino pleiadene

A mixture of 33 g. 1,2,3,12a-tetrahydro-7(12H)-pleiadenone (0.133 mole) and 33 g. hydroxyamine hydrochloride (0.47 mole) and 500 ml. pyridine is heated under reflux for 19 hours. The solution is allowed to cool and the solvent is evaporated in vacuo, the residue is then dissolved in chloroform, washed with water and then with sodium chloride, dried over magnesium sulfate and evaporated in vacuo. The residue is crystallized from ethanol and the crystals are further purified by trituration with ether and finally recrystallization from ethanol to give 1,2,3,7,12, 12a-hexahydro-7-oximino pleiadene, M.P. 189.5–196° C.

When the above process is carried out and (a) 1,2,3,12a-tetrahydro-5-methyl-7(12H)-pleiadenone,
(b) 5-chloro-1,2,3,12a-tetrahydro-7(12H)-pleiadenone,
(c) 1,2,3,12a-tetrahydro-5-methoxy-7-(12H)-pleiadenone,
(d) 1,2,3,4,13,13a-hexahydro-6-trifluoromethyl-8H-dibenzo[b,ef]heptalen-8-one, (e) 1,2,3,4,13,13a-hexahydro-8H-dibenzo[b,ef]heptalen-8-one,
(f) 1,2,3,12a-tetrahydro-10-trifluoromethyl-7(12H)-pleiadenone, or
(g) 10-chloro-1,2,3,12a-tetrahydro-7(12H)-pleiadenone is used in place of 1,2,3,12a-tetrahydro-7-(12H)-pleiadenone, there is obtained:

(a) 1,2,3,7,12,12a-hexahydro-5-methyl-7-oximino-pleiadene,
(b) 5-chloro-1,2,3,7,12,12a-hexahydro-7-oximino-pleiadene,
(c) 1,2,3,7,12,12a-hexahydro-5-methoxy-7-oximino-pleiadene,
(d) 1,2,3,4,13,13a-hexahydro-8-oximino-6-trifluoromethyl-8H-dibenzo[b,ef]heptalen,
(e) 1,2,3,4,13,13a-hexahydro-8-oximino-8H-dibenzo[b,ef]heptalen,
(f) 1,2,3,12,12a-hexahydro-7-oximino-10-trifluoromethyl-pleiadene, or
(g) 10-chloro-1,2,3,7,12,12a-hexahydro-7-oximino-pleiadene, respectively.

EXAMPLE 6

1,2,3,7,12,12a-hexahydro-7-amino pleiadene

A suspension of 17.5 g. 1,2,3,7,12,12a-hexahydro-7-oximino pleiadene (0.067 mole) in 200 ml. ethanol is heated to reflux, at which time most of the solid is in solution. The external heat is removed and 23 g. (1 mole) of sodium metal is added at a rate maintaining a vigorous reflux for 1 hour. When all the soidum is consumed, the solvent is removed in vacuo. The residue is treated with chloroform and washed with water and a saturated sodium chloride solution, then dried over magnesium sulfate and evaporated in vacuo. The residue is crystallized from ethanol and recrystallized from chloroform-ethyl ether (1:1) to give 1,2,3,7,12,12a-hexahydro-7-amino pleiadene; M.P. 84–86° C.

When the above process is carried out and in place of 1,2,3,7,12,12a-hexahydro-7-oximino pleiadene there is used the corresponding starting material designated as products (a)–(g) in Example 5, there is obtained:

(a) 1,2,3,7,12,12a-hexahydro-5-methyl-7-amino-pleiadene,
(b) 5-chloro-1,2,3,7,12,12a-hexahydro-7-amino-pleiadene,
(c) 1,2,3,7,12,12a-hexahydro-5-methoxy-7-amino-pleiadene,
(d) 1,2,3,4,13,13a-hexahydro-8-amino-6-trifluoromethyl-8H-dibenzo[b,ef]heptalen,
(e) 1,2,3,4,13,13a-hexahydro-8-amino-8H-dibenzo[b,ef]heptalen,
(f) 1,2,3,12,12a-hexahydro-7-amino-10-trifluoromethyl-pleiadene, or
(g) 10-chloro-1,2,3,7,12,12a-hexahydro-7-amino pleiadene, respectively.

EXAMPLE 7

N-(1,2,3,7,12,12a-hexahydro-7-pleiadyl)-N-methyl urea

To a solution of 10.6 g. (0.043 mole) 1,2,3,7,12,12a-hexahydro-7-amino pleiadene in 110 ml. tetrahydrofuran and 3.35 ml. (3.14 g., 0.055 mole) of methyl isocyanate is added dropwise with stirring at room temperature. The mixture is stirred for 2 hours at room temperature and the solvent is removed in vacuo. The solid residue is triturated with ether and then recrystallized from hot isopropanol to give N-(1,2,3,7,12,12a-hexahydro-7-pleiadyl)-N-methyl urea; M.P. 232–236° C.

When the above process is carried out and in place of 1,2,3,7,12,12a-hexahydro-7-amino pleiadene, there is used the corresponding starting material designated as products (a)–(g) in Example 6, there is obtained:

(a) N-(1,2,3,7,12,12a-hexahydro-5-methyl-7-pleiadyl)-N-methyl urea,
(b) N-(5-chloro-1,2,3,7,12,12a-hexahydro-7-pleiadyl)-N-methyl urea,
(c) N-(1,2,3,7,12,12a-hexahydro-5-methoxy-7-pleiadyl)-N-methyl urea,
(d) N-(1,2,3,7,13,13a-hexahydro-8-pleiadyl-6-trifluoromethyl-8H-dibenzo[b,ef]heptalen)-N-methyl urea,
(e) N-(1,2,3,4,13,13a-hexahydro-8-pleiadyl-8H-dibenzo[b,ef]heptalen)-N-methyl urea,
(f) N-(1,2,3,7,12,12a-hexahydro-7-pleiadyl-10-trifluoromethyl-pleiadyl-N-methyl urea, or
(g) N-(10-chloro-1,2,3,7,12,12a-hexahydro-7-pleiadyl)-N-methyl urea, respectively.

EXAMPLE 8

1,2,3,7,12,12a-hexahydro-7-hydroxy pleiadene

A solution of 33 g. (0.133 mole) 1,2,3,12a-tetrahydro-7-(12H)-pleiadenone in 360 ml. ethanol is cooled to 10° and 5.03 g. sodium borohydride is added portionwise. The reaction mixture is allowed to warm to room temperature and stirred there for 17 hours. Then add a solution of 125 ml. ethanol/25 ml. water and warm on a steam bath for 30 minutes, cool and evaporate the ethanol. The residue is dissolved in chloroform, washed with water and saturated in soidum chloride solution, then dried over magnesium sulfate and evaporated in vacuo. The residue is triturated in cold ethyl ether to give 1,2,3,7,12,12a-hexahydro-7-hydroxy pleiadene; M.P. 118°–133° C.

When the above process is carried out and in place of 1,2,3,12a-tetrahydro-7-(12H)-pleiadenone there is used the corresponding starting materials designated as products (a)–(g) in Example 7, there is obtained:

(a) 1,2,3,7,12,12a-hexahydro-5-methyl-7-hydroxy pleiadene,
(b) 5-chloro-1,2,3,7,12,12a-hexahydro-7-hydroxy pleiadene,
(c) 1,2,3,7,12,12a-hexahydro-5-methoxy-7-hydroxy pleiadene,
(d) 1,2,3,13,13a-hexahydro-8-hydroxy-6-trifluoromethyl-8H-dibenzo[b,ef]heptalen,
(e) 1,2,3,4,13,13a-hexahydro-8-hydroxy-8H-dibenzo[b,ef]heptalen,
(f) 1,2,3,12,12a-hexahydro-7-hydroxy-10-trifluoromethyl pleiadene, or
(g) 10-chloro-1,2,3,7,12,12a-hexahydro-7-hydroxy pleiadene, respectively.

EXAMPLE 9

1,2,3,7,12,12a-hexahydro-7-chloro-pleiadene

A solution of 12.2 g. (0.049 mole) 1,2,3,7,12,12a-hexahydro-7-hydroxy pleiadene in 250 ml. benzene is treated with gaseous HCl for 15 minutes, maintaining a temperature below 30° C. The resulting solution is treated with calcium chloride, filtered and evaporated in vacuo and finally recrystallized from ethyl ether to give 1,2,3,7,12,12a-hexahydro-7-chloro pleiadene; M.P. 135–137° C.

When the above process is carried out and in place of 1,2,3,7,12,12a-hexahydro-7-hydroxy pleiadene there is used the corresponding starting materials designated as products (a)–(g) in Example 8, there is obtained (a) 1,2,3,7,12,12a-hexahydro-5-methyl-7-chloro pleiadene,
(b) 5-chloro-1,2,3,7,12,12a-hexahydro-7-chloro pleiadene,
(c) 1,2,3,7,12,12a-hexahydro-5-methoxy-7-chloro pleiadene,
(d) 1,2,3,4,13,13a-hexahydro-8-chloro-6-trifluoromethyl-8H-dibenzo[b,ef]-heptalen,

11

(e) 1,2,3,4,13,13a-hexahydro-8-chloro-8H-dibenzo[b,ef]heptalen,
(f) 1,2,3,12,12a-hexahydro-7-chloro-10-trifluoromethyl pleiadene, or
(g) 10-chloro-1,2,3,7,12,12a-hexahydro-7-chloro pleiadene, respectively.

EXAMPLE 10

1,2,3,7,12,12a-hexahydro-7-cyano pleiadene

A suspension of 34.8 g. (0.26 mole) of silver cyanide and 300 ml. benzene is warmed, in the dark, to 35° and a solution of 35 g. (0.13 mole) of 1,2,3,7,12,12a-hexahydro-7-chloro-pleiadene is added dropwise with stirring. The mixture is heated at reflux for 5 hours and filtered while hot. The solvent is evaporated in vacuo and the residue crystallized by trituration with ether and recrystallized from hot ethyl acetate to give 1,2,3,7,12,12a-hexahydro-7-cyano-pleiadene; 152–156° C.

When the above process is carried out and in place of 1,2,3,7,12,12a-hexahydro-7-chloro pleiadene there is used the corresponding starting materials designated as product (a)–(g) in Example 9, there is obtained (a) 1,2,3,7,12,12a-hexahydro-5-methyl-7-cyano pleiadene,
(b) 5-chloro-1,2,3,7,12,12a-hexahydro-7-cyano pleiadene,
(c) 1,2,3,7,12,12a-hexahydro-5-methoxy-7-cyano pleiadene,
(d) 1,2,3,4,13,13a-hexahydro-8-cyano-6-trifluoromethyl-8H-dibenzo[b,ef]heptalen
(e) 1,2,3,4,13,13a hexahydro-8-cyano-8H-dibenzo[b,ef]heptalen,
(f) 1,2,3,12,12a-hexahydro-7-cyano-10-trifluoromethyl pleiadene, or
(g) 10-chloro-1,2,3,7,12,12a-hexahydro-7-cyano pleiadene, respectively.

EXAMPLE 11

1,2,3,7,12,12a-hexahydro-7-carboxamido-pleiadene

A stream of boron trifluoride is passed over a suspension of 12.95 g. (0.05 mole) 1,2,3,7,12,12a-hexahydro-7-cyano pleiadene and 60 ml. acetic acid and 11 ml. water until saturated. The temperature rose to 135–145° C. and is maintained there for 12 minutes by external heating. The mixture is cooled in ice and made basic by the addition of 6 N NaOH. The resulting precipitate is filtered, washed with water, dissolved in chloroform and dried over magnesium sulfate and then evaporated in vacuo. The residue is crystallized from ether and recrystallized from ethanol to give 1,2,3,7,12,12a-hexahydro-7-carboxamido-pleiadene; M.P. 199.5°–201° C.

When the above process is carried out and in place of 1,2,3,7,12,12a-hexahydro-7-cyano pleiadene there is used the corresponding starting material designated as product (a)–(g) in Example 10 there is obtained (a) 1,2,3,7,12,12a-hexahydro-5-methyl-7-carboxamido pleiadene,
(b) 5-chloro-1,2,3,7,12,12a-7-carboxamido pleiadene,
(c) 1,2,3,7,12,12a-hexahydro-5-methoxy-7-carboxamido pleiadene,

12

(d) 1,2,3,4,13,13a-hexahydro-8-carboxamido-6-trifluoromethyl-8H-dibenzo[b,ef]heptalen,
(e) 1,2,3,4,13,13a-hexahydro-8-carboxamido-8H-dibenzo[b,ef]heptalen,
(f) 1,2,3,7,12,12a-hexahydro-7-carboxamido-10-trifluoromethyl pleiadene, or
(g) 10-chloro-1,2,3,7,12,12a-hexahydro-7-carboxamido pleiadene, respectively.

What is claimed is:

1. A compound of the formula:

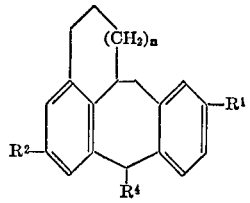

wherein $n$ represents 1 or 2;
$R^1$ represents H, halo having an atomic weight of 19–36, or trifluoromethyl; and
$R^2$ represents H, halo having an atomic weight of 19–36, trifluoromethyl, straight chain lower alkyl, or straight chain lower alkoxy; and
$R^4$ represents

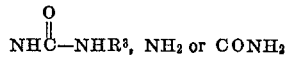

wherein
$R^3$ represents lower straight chain alkyl having 1 to 4 carbon atoms, e.g., methyl, ethyl and butyl.

2. The compound of claim 1 which is N-(1,2,3,7,12,12a-hexahydro-7-pleiadyl)-N-methyl urea.
3. The compound of claim 1 which is 1,2,3,7,12,12a-hexahydro-7-amino-pleiadene or a pharmaceutically acceptable acid addition salt thereof.
4. The compound of claim 1 which is 1,2,3,7,12,12a-hexahydro-7-carboxamido-pleiadene.

References Cited

UNITED STATES PATENTS 3,445,519   5/1969   Kollonitsch _____ 260—558

HARRY I. MOATZ, Primary Examiner

U.S. Cl. X.R.

260—343.2 R, 465 R, 515 R, 515 A, 558 R, 559 R, 566 A, 570.5 R, 618 F, 649 R; 424—322, 324, 330